Dec. 21, 1937.  V. A. KJAER  2,103,161

LUBRICATING DEVICE FOR DRIVING CHAINS

Original Filed Dec. 12, 1932

V. A. Kjaer
INVENTOR

By Glascock Downing & Seebold
Attys.

Patented Dec. 21, 1937

2,103,161

UNITED STATES PATENT OFFICE 2,103,161

LUBRICATING DEVICE FOR DRIVING CHAINS

Viggo Axel Kjær, Copenhagen, Denmark

Original application December 12, 1932, Serial No. 646,937. Divided and this application March 25, 1935, Serial No. 12,990. In Denmark January 12, 1932

2 Claims. (Cl. 184—15)

This application is a division of my earlier application Serial No. 646,937, filed December 12, 1932, and the invention relates to an improved lubricating device for driving chains of the kind in which the links are connected together by hollow pins and bushes surrounding the pins, and in which said pins are provided with transverse bore holes or channels for the supply from the interior of the pins to the bearing surfaces between the pin and bush of lubricating oil, which is supplied to the hollow pin from the exterior by means of one or more oil supply devices arranged adjacent a chain wheel opposite the spaces between its teeth and rotating with said wheel.

The object of the invention is to provide a lubricating device which is particularly simple and suitable as compared with known devices of the kind mentioned, by which the lubricating oil is brought to pass into the pins from supply devices, which again and again must be carried into tight connection with the pins during the movement of the chain and consequently are exposed to a great wear, besides the fact that the arrangements in question are rather complicated.

According to the invention the oil supply device consists of injection nozzles which are not attached close to the pins of the chain but are at some distance therefrom, the oil being injected into the interior of the pins from said nozzles under a suitable high oil pressure. The lubricating oil is then forced out of the hollow interior of the pin by the centrifugal force through the transverse bore holes to the outer surface of the pin bearing against the inner surface of the bush, and hereby an effective oiling of the bearing surfaces between the bush and pin is attained. This oiling may be particularly good, if the dimensions of the bush are not larger than would allow the bush to yield resiliently on the chain links passing from the tensioned to the slack chain part and vice-versa, so that it exerts a pumping action on the lubricating oil between the bush and pin.

Figure 1:
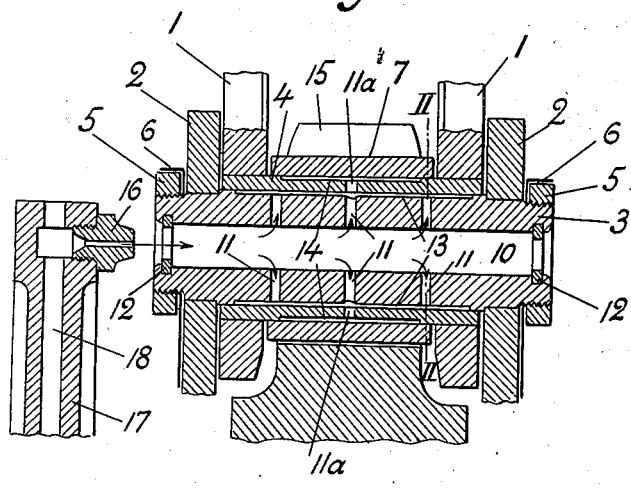
Figure 2:
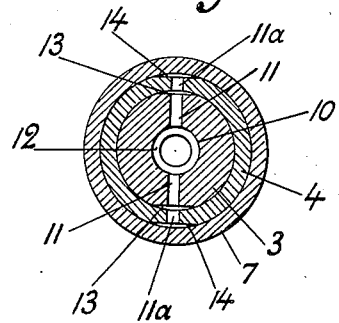

The invention is by way of example illustrated in the accompanying drawing, whereon Fig. 1 is a cross-section through a part of a chain link and a chain wheel with an injection nozzle for oiling purposes according to the invention, and Fig. 2 is a section on the line II—II of Fig. 1.

In Fig. 1, 1 and 2 designate the link plates of two successive links of a simplex roller chain. The plates are connected together by a hollow pin 3 and a bush 4 partly surrounding the pin. The latter is fitted with nuts 5 which are secured by washers or plates 6 with raised or bent over edges. A freely rotatable roller 7 is fitted on the bush 4.

10 designates the longitudinal bore in the pin 3, in which also transverse bore holes 11 are provided. At the ends of the bore 10 rings 12 are placed for preventing the outflow of lubricating oil. In the bush 4 holes 11a are provided for supplying oil to the outer surface of the bush. On both sides of the pin 3 and bush 4 (above and below) there are small grooves 13 and 14 acting as lubricating passages.

The chain is carried by a chain wheel 15 opposite the spaces between the teeth of which and at some distance from the pins 3 are arranged a series of injection nozzles 16 which in the example illustrated are carried by a disc 17 rotating with the chain wheel 15. The lubricating oil is supplied under pressure through passages 18 from a lubricating oil system.

Under load on the chain link the bush 4 rests against the pin 3, whilst it, as soon as the chain link is again unloaded, e. g. because the link passes over on to the slack side of the chain, again moves a little away from the pin and thus promotes the oil circulation. So long as the chain link is on the chain wheel, it receives adequate supply of lubricating oil from the injection nozzle 16, the oil being retained by the rings 12 from flowing out, and by centrifugal action it is forced out through the holes 11 and 11a and the grooves 13 and 14 to the bearing surface between the pin 3 and the bush 4 as well as to the bearing surface between the latter and the roller 7.

It is pointed out that the invention may be utilized even by very fast running chains, and that it especially aims at closed chains, by which the oil pressure on the injection nozzles may be maintained constantly, so that special valve devices completely may be avoided.

I claim:

1. In a chain arrangement comprising a toothed chain wheel and a chain mounted on said wheel, said chain including links, and bushes and hollow pins connecting said links, the pins being provided with axial bores and transverse bore holes for the supply from the interior of the pin to the bearing surfaces between the pin and bush of lubricating oil which is supplied to the hollow pin from the exterior, an oil supply device arranged adjacent the chain wheel opposite the spaces between its teeth and rotating with said wheel, said oil supply device consisting of injection nozzles permanently spaced from the chain and connected with means for supplying oil under pressure, the axial bores of said pins having a relatively large diameter and an unobstructed opening of a smaller diameter thereto from the end of the pin adjacent the oil supply device, whereby the oil discharged from said nozzles is directed wholly within the interior of the pins.

2. In a chain arrangement comprising a toothed chain wheel and a chain mounted on said wheel, said chain including links and bushes and pins connecting said links, the pins being provided with axial bores and transverse bore holes for the supply from the interior of the pin to the bearing surfaces between the pin and bush of lubricating oil which is supplied to the hollow pin from the exterior, an oil supply device arranged adjacent the chain wheel opposite the spaces between its teeth and rotating with said wheel, said oil supply device consisting of injection nozzles permanently spaced from the chain and connected with means for supplying oil under pressure, the oil being injected from said nozzles into the bores of the pins, said chain pins at the ends of their bores being provided with rings serving to prevent the lubricating oil injected into the pins from flowing out of the pins laterally.

VIGGO AXEL KJÆR.